United States Patent [19]

Stern

[11] Patent Number: 4,652,749

[45] Date of Patent: Mar. 24, 1987

[54] OPTICAL COORDINATE MEASURING SYSTEM WITH DUAL PATH REFLECTING MEANS

[75] Inventor: Howard Stern, Greenlawn, N.Y.

[73] Assignee: Robotic Vision Systems, Inc., Hauppauge, N.Y.

[21] Appl. No.: 714,484

[22] Filed: Mar. 21, 1985

[51] Int. Cl.⁴ .............................. H01J 3/14; H01J 5/16
[52] U.S. Cl. ........................................... 250/234; 356/1
[58] Field of Search ............... 250/216, 234, 235, 236, 250/221, 560, 561; 356/1, 4; 350/632, 634

[56] References Cited

U.S. PATENT DOCUMENTS 3,928,759  12/1975  Sansone .............................. 250/236
4,493,990   1/1985  Koszytorz ............................ 350/6.5

Primary Examiner—David C. Nelms
Assistant Examiner—William L. Oen
Attorney, Agent, or Firm—Max Fogiel

[57] ABSTRACT

An arrangement for scanning the measurement field of view of an optical measurement system, in which one or more reflecting surfaces are placed within the optical path(s) of an optical measurement system. The reflecting surface is rotated and/or translated through a control unit which controls accurately the rotating and/or translating motion. Mathematical corrections are applied to determine the true measured coordinates. The view direction of the optical measurement system is diverted by the reflecting surface mounted on a precision mechanism for scanning the view in a controlled manner.

3 Claims, 4 Drawing Figures

OPTICAL COORDINATE MEASURING SYSTEM WITH DUAL PATH REFLECTING MEANS

BACKGROUND OF THE INVENTION

Optical measurement systems have often been constructed with a fixed direction of view. In order to cover a range of directions the sensor would normally be translated or rotated. In some circumstances, however, moving the entire sensor structure is undesirable. By deflecting the light path(s) from the sensor to the subject, the present invention provides an arrangement for increasing the sensor field of view.

SUMMARY OF THE INVENTION

It is an object of the present invention to overcome the prior art disadvantages. In particular, it is the object of the present invention to provide an arrangement for scanning the field of view of an optical measurement sensor without moving the sensor. Though the term optical is used, the mechanism described is also practical well above and below the visible spectrum.

In keeping with these objects, and with still others which will become apparent as the description proceeds, the important characteristics of the invention are: the size and weight of the deflecting mechanism can be substantially less than the sensor for more readily implemented scanning; the scan angle is twice the angle of deflector rotation for greater scan angles within confined areas; and simplicity of the implementation accompanied by high potential accuracy.

The present invention is comprised as follows: a moveable device with reflecting areas(s) is placed between the sensor of an optical measurement system and the subject to be measured. The light path(s) of the sensor are deflected at an angle depending on the orientation of the reflecting area(s). Surfaces residing in the new directions of the reflected light path(s) can now be measured.

The present invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

DESCRIPTION OF PREFERRED EMBODIMENTS

Figure 1:
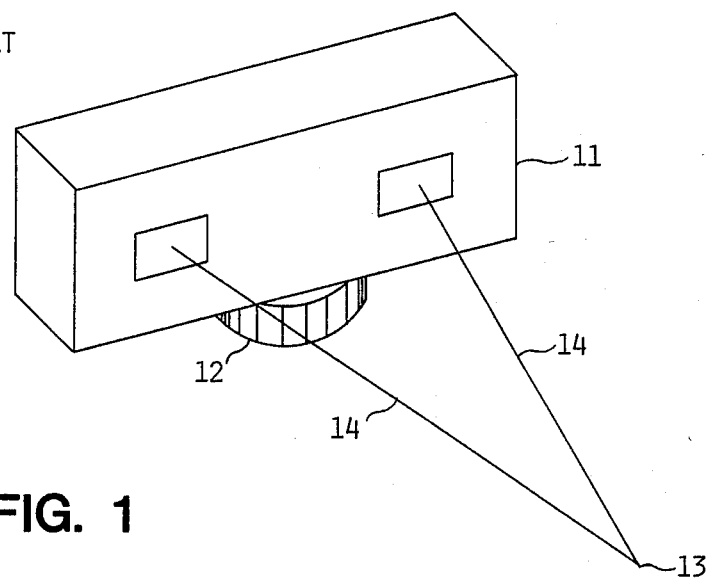
FIG. 1 is a schematic perspective view and shows an optical sensor scanned by a means of the prior art.

Three dimensional optical measurement sensors, whether they use a single light path based on "time of flight" or two light paths based on triangulation, generally have a field of view in a fixed direction. Similarly two-dimensional measuring systems generally have a field of view in a fixed direction. FIG. 1 illustrates a typical triangulation-based sensor 11. The sensor 11 may be stereoscopic, receiving light from two angles from a section on a surface to be measured; or project a light pattern from one angle and receive the pattern's reflected energy from a second angle. The known distance between light receivers or projector and receiver combined with known projected angle and measured received angle(s) provides sufficient information to compute, by triangulation, the three-dimensional measurements of the section of a surface lying at the intersection 13 of the light paths 14. The sensor 11 may be placed on a rotating table 12 to cause intersection 13 to scan to other sections of the surface to be measured. However, it may be undesirable to move sensor 11.

Figure 2:
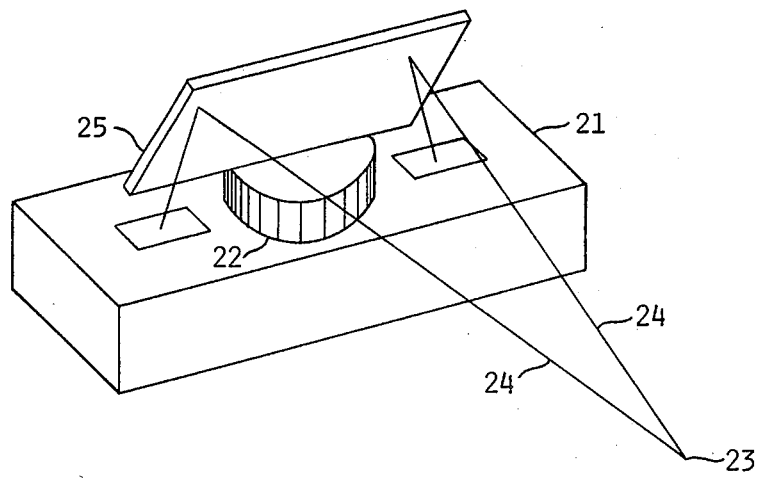
FIG. 2 shows an optical sensor with field of view scanned by a mirrored surface.

FIG. 2 shows a preferred embodiment of the invention for a sensor based on triangulation. A structure 25, for example a flat mirror with reflecting areas within light paths 24, is placed so that the paths 24 are diverted to intersect at an intersection 23. The structure 25 may be mounted on a rotating table 22 or a gimbaled mechanism with more than one degree of freedom. Angular rotation of structure 25 by 1° then produces 2° of rotation of intersection 23 about the axis of rotation of structure 25. This occurs because the angle of incidence and reflection are always equal, and a change in one produces an equal change in the other, thereby doubling the effective rotation. This makes possible twice as much scanning angle for a given amount of rotation of structure 25. Structure 25 can be enclosed as part of the housing of sensor 21 with appropriate openings for light paths 24, to eliminate any external moving surfaces.

There may, of course, be instances when translation of the optical paths 24 are desired, in which case mechanism 22 can provide such translation.

Figure 3:
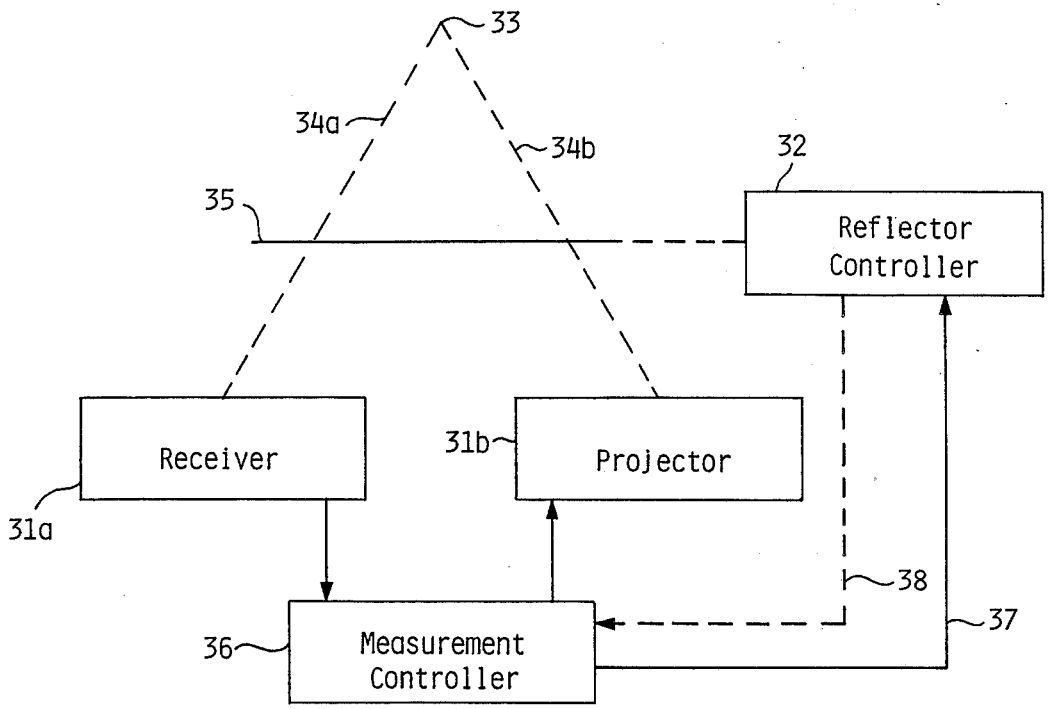
FIG. 3 is a block diagram of a triangulation-based optical measurement system for controlling purposes.

In either case, mechanism 22, whether rotating or translating structure 25, must be controlled precisely as a part of a triangulation-based optical measurement system as shown in the block diagram of FIG. 3. The principles involved are the same for single light path, time-of-flight systems. Measurement controller 36 commands reflector controller 32 via control signal 37 to drive reflector 35 to assume a position or scan a region. Controller 32 may be a precision closed loop device needing no feedback signal 38 to the controller 36 or signal 38 may return synchronizing information or precision position/angle information. Controller 36 commands projector 31b to project a light pattern which reflects off reflector 35 along path 34b, imaging on a surface to be measured in the vicinity of the measurement system field of view 33. Light from the pattern reflected from the surface being measured travels along path 34a, reflects off reflector 35, and is imaged in receiver 31a. Receiver 31a converts the light image to a signal transmitted to controller 36 which converts the signal into dimensional measurement values that take into account the precision movement of reflector 35.

Figure 4:
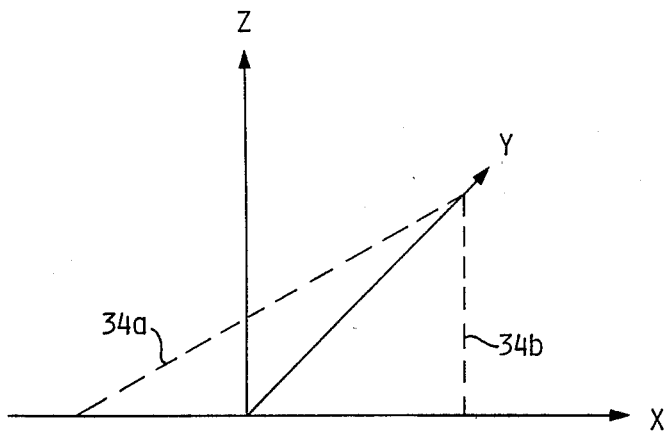
FIG. 4 is a diagrammatic view showing geometrical relationships of light paths within a coordinate system.

Light paths 34a and 34b have a common central plane passing through field of view 33. We can express this plane conventionally as $Ax+By+Cz+D=0$ with the x, y, z axes defined as in FIG. 4. If the plane formed by 34a and 34b lies in the x, y plane, then $A=B=D=0$ and $C=1$. Therefore $Z=0$ is the equation of the nominal measurement plane. Reflector 35 essentially rotates and/or translates the plane to a new plane $A'Z + B'Y + C'Z + D = 0$. By using homogeneous coordinates we can combine all matrix transformations into single $4 \times 4$ matrices. All rotations are referred to the mechanism 32 axis of rotation, and linear translations refer to the reflector 35.

Any axis of rotation can be brought into coincidence with a cardinal axis by two rotations and two translations. Therefore, even though manufacturing tolerances may prevent the mechanism 32 axis of rotation from lying exactly at a precise location, the errors can be compensated.

For example, we shall examine FIG. 2. Assume reflecting structure 25 is a flat mirror mounted 45° to the plane formed by light paths 24. Since the angle of 45° is doubled by reflection, light paths 24 start out in the x-y plane and deflect 90° to be parallel to the x-y plane. The axis of mechanism 22 is designed to lie along the y axis. If we choose arbitrarily to define the x-z plane parallel to the light paths 24, then any error in placement of reflector 25 and mechanism 22 can be absorbed by two angular rotations and two linear translations of the axis of mechanism 22 to align it to the y axis of the system thus defined. A rotation about the x and z axes would bring the axis of mechanism 22 parallel to the y axis. A translation in x and z would bring the parallel axis into coincidence with the y axis. These small angular and linear corrections can be determined by making measurements with the axis of mechanism 22 at one angle, then at a second angle, and solving simultaneously for the unknown four values.

Once the axis of mechanism 22 is aligned mathematically to the y axis, then rotation about the y axis is merely the measured (or commanded) value of rotation of that axis. The results are then translated and rotated back by the small error values to give the final answer. Mathematically this can be expressed as:

$$\begin{bmatrix} 1 & 0 & 0 & -dx \\ 0 & 1 & 0 & 0 \\ 0 & 0 & 1 & -dz \\ 0 & 0 & 0 & 1 \end{bmatrix} \begin{bmatrix} C\alpha & S\alpha & 0 & 0 \\ -S\alpha & C\alpha & 0 & 0 \\ 0 & 0 & 1 & 0 \\ 0 & 0 & 0 & 1 \end{bmatrix} \begin{bmatrix} 1 & 0 & 0 & 0 \\ 0 & C\gamma & S\gamma & 0 \\ 0 & -S\gamma & C\gamma & 0 \\ 0 & 0 & 0 & 1 \end{bmatrix} \begin{bmatrix} X \\ Y \\ Z \\ 1 \end{bmatrix} = \begin{bmatrix} X' \\ Y' \\ Z' \\ 1 \end{bmatrix}$$

where
$\gamma$ is the angle that axis 22 is rotated about the x axis
$\alpha$ is the angle that axis 22 is rotated about the z axis
dx is the amount that axis 22 is translated along the x axis
dz is the amount that axis 22 is translated along the z axis C means Cosine and S means Sine
X, Y, Z are the measured coordinates and X', Y', Z' are the coordinates after aligning the data to the rotation axis 22.

Next we incorporate the rotation and reverse the correction factors:

$$\begin{bmatrix} 1 & 0 & 0 & 0 \\ 0 & C\gamma & -S\gamma & 0 \\ 0 & S\gamma & C\gamma & 0 \\ 0 & 0 & 0 & 1 \end{bmatrix} \begin{bmatrix} C\alpha & -S\alpha & 0 & 0 \\ S\alpha & C\alpha & 0 & 0 \\ 0 & 0 & 1 & 0 \\ 0 & 0 & 0 & 1 \end{bmatrix} \begin{bmatrix} 1 & 0 & 0 & dx \\ 0 & 1 & 0 & 0 \\ 0 & 0 & 1 & dz \\ 0 & 0 & 0 & 1 \end{bmatrix} \begin{bmatrix} C\beta & 0 & S\beta & 0 \\ 0 & 1 & 0 & 0 \\ -S\beta & 0 & C\beta & 0 \\ 0 & 0 & 0 & 1 \end{bmatrix} \begin{bmatrix} X' \\ Y' \\ Z' \\ 1 \end{bmatrix} = \begin{bmatrix} X'' \\ Y'' \\ Z'' \\ 1 \end{bmatrix}$$

where $\beta$ = twice the angle of rotation of axis 22. X'', Y'', Z'' are the true coordinates of the measured point X, Y, Z. The invention has been described and illustrated with reference to an exemplary embodiment. It is not to be considered limited thereto, inasmuch as all modifications and variations which might offer themselves are intended to be encompassed within the scope of the appended claims.

What is claimed is:

1. Apparatus for scanning a measurement field of view of an optcial coordinate measurement system comprising: an optical coordinate measurement system with at least two optical paths from said system to a surface to be measured; reflecting surface means placed within each optical path of said system; means for rotating and translating said reflecting surface means; and control means for controlling said means for rotating and translating said reflecting surface means.

2. Apparatus as defined in claim 1, wherein said reflecting surface means comprises a flat mirror.

3. A method for obtaining coordinate measurement data in scanning a measurement field of view of an optcial coordinate measurement system comprising the steps of: providing an optical coordinate measurement system with at least two optical paths from said system to a surface to be measured; placing reflecting surface means within each optical path of said system; rotating and/or translating said reflecting surface means; controlling said rotating and/or translating steps; measuring known surfaces at two rotation angles and/or two translation positions; obtaining mathematical correction factors from said measurements; measuring coordinates of a surface to be measured via said system and said reflecting means; and applying said mathematical corrections to said measured coordinates to obtain true measured coordinates.

* * * * *